(12) United States Patent
LeJambre et al.

(10) Patent No.: US 6,375,419 B1
(45) Date of Patent: *Apr. 23, 2002

(54) FLOW DIRECTING ELEMENT FOR A TURBINE ENGINE

(75) Inventors: Charles R. LeJambre, Marlborough; Bruce P. Biederman, Meriden, both of CT (US); Aaron J. Gleixner, Philadelphia, PA (US); Chad J. Yetka, West Palm Beach, FL (US)

(73) Assignee: United Technologies Corporation, Hartford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/459,986

(22) Filed: Jun. 2, 1995

(51) Int. Cl.[7] ............................... F01D 5/14; F01D 9/06
(52) U.S. Cl. .................... 415/191; 415/192; 415/208.2; 416/223 A; 416/238
(58) Field of Search .................... 415/191, 192, 415/208.2, 200.1; 416/223 A, 238

(56) References Cited

U.S. PATENT DOCUMENTS

| | | | |
|---|---|---|---|
| 1,142,915 A | 6/1915 | Scott | |
| 1,288,360 A | 12/1918 | Zaar | |
| 1,352,877 A | 9/1920 | Cogliolo | |
| 1,539,395 A | * 5/1925 | Lösel | 415/192 |
| 1,806,345 A | 5/1931 | Halvorsen | |
| 2,302,054 A | 11/1942 | Putt | |
| 2,355,413 A | 8/1944 | Bloomberg | |
| 2,460,902 A | 2/1949 | Odor | |
| 2,551,371 A | 5/1951 | Grigg | |
| 2,746,672 A | * 5/1956 | Doll, Jr. et al. | 415/192 |
| 2,795,394 A | * 6/1957 | Slivka et al. | 415/192 |
| 2,801,790 A | 8/1957 | Doll, Jr. | 230/132 |
| 2,938,662 A | 5/1960 | Eckert et al. | 230/134 |
| 3,384,346 A | * 5/1968 | Halls et al. | 415/191 |
| 3,652,182 A | * 3/1972 | Deich et al. | 416/223 A |
| 3,871,791 A | 3/1975 | Guy et al. | 416/193 |
| 3,986,791 A | * 10/1976 | Paciga et al. | 415/208.2 |
| 4,012,172 A | 3/1977 | Schwaar et al. | 416/228 |
| 4,130,375 A | * 12/1978 | Korta | 415/191 |
| 4,195,396 A | * 4/1980 | Blazek | 415/208.1 |
| 4,208,167 A | * 6/1980 | Yasugahira et al. | 415/191 |
| 4,621,979 A | 11/1986 | Zipps et al. | 416/219 |
| 4,682,935 A | * 7/1987 | Martin | 416/223 A |
| 4,801,243 A | 1/1989 | Norton | 416/89 |
| 4,919,593 A | * 4/1990 | Brown | 416/223 A |
| 5,088,892 A | 2/1992 | Weingold et al. | 416/193 |
| 5,209,643 A | 5/1993 | Cole | 416/223 |
| 5,215,432 A | * 6/1993 | Pickering et al. | 415/191 |
| 5,292,230 A | * 3/1994 | Brown | 415/191 |
| 5,342,170 A | * 8/1994 | Elvekjaer et al. | 416/223 A |

FOREIGN PATENT DOCUMENTS

| | | | |
|---|---|---|---|
| DE | 434405 | 2/1925 | |
| EP | 0 251 978 | 7/1988 | |
| GB | 479342 | 2/1938 | |
| GB | 916672 | * 1/1963 | 415/208.1 |
| NO | 85191 | 1/1955 | |
| RU | 0646095 | * 2/1979 | 416/223 A |
| RU | 877086 | 11/1981 | |

* cited by examiner

Primary Examiner—Christopher Verdier
(74) Attorney, Agent, or Firm—Kenneth C. Baran

(57) ABSTRACT

A flow directing element, such as a vane for a turbine engine compressor, has a variable chord to improve compressor surge margin without compromising compressor efficiency. The vane has an airfoil section (70) with a leading edge (80), a trailing edge (82), a root (84) and a tip (88). The chord of the airfoil generally increases from a first value at the root to a second larger value at a part span location (110) intermediate the root and the tip so that when the airfoil is installed in a compressor, the location of the trailing edge becomes closer to the compressor discharge as the spanwise distance from the root increases. The chord is generally constant from the part span location to the tip.

30 Claims, 5 Drawing Sheets

$\dfrac{P_{DISCHARGE}}{P_{INTAKE}}$

MASS FLOW RATE

US 6,375,419 B1

FLOW DIRECTING ELEMENT FOR A TURBINE ENGINE

TECHNICAL FIELD

This invention relates to gas turbine engines and more particularly to a flow directing element such as a stator vane or a blade for the compressor or turbine section of such engines.

BACKGROUND OF THE INVENTION

Modern gas turbine engines employ axial flow compressors or centrifugal compressors to pressurize air to a pressure and temperature suitable for combustion. The compressor directs air from a region of low pressure at the compressor intake to a region of higher pressure at the compressor discharge. Because air naturally flows from a region of high pressure to a region of low pressure, the compression process involves considerable expenditure of energy, and it is desirable to minimize this expenditure by making the compressor as efficient as possible.

Because the direction of airflow through the engine compressor is opposite to the natural tendency of air to flow in the direction of decreasing pressure, compressors are susceptible to an aerodynamic instability referred to as surge. Compressor surge is a violent event involving the sudden and unanticipated reversal of the airflow direction through the compressor. At best, a surge results in the momentary loss of engine power followed by a resumption of the normal airflow through the compressor and normal operation of the engine. In more severe cases, normal airflow through the compressor is not readily reestablished, resulting in a sustained loss of engine power. Moreover, the violent character of a surge can damage engine components.

Clearly, surge is a phenomenon to be avoided. To avoid surge, compressor designers seek to increase the surge margin of a compressor. As explained more fully hereinafter, surge margin is a measure of a compressor's resistance to surge. Unfortunately, and as is well known in the art, increasing a compressor's surge margin results in diminished compressor efficiency and increased fuel consumption during sustained, steady state operation of the engine.

What is needed is a means for improving compressor surge margin without compromising compressor and engine efficiency.

DISCLOSURE OF THE INVENTION

In accordance with the present invention, the airfoil portion of a blade or vane for a turbine engine is uniquely shaped to redistribute the airflow velocity across the span of the airfoil. In particular, the airfoil has a chord length which increases from a minimum value at the airfoil root to a greater value at a part span location intermediate the root and the airfoil tip. Between the part span location and the tip, the chord length is substantially constant.

In one embodiment of the invention, the part span location is preferably between 25% and 75% of the airfoil span. In another embodiment the ratio of the chord length at the airfoil root to the chord length at the part span location is between 0.7 and 0.9.

The invention has been demonstrated to be especially effective when used as a stator vane in at least some of the fixed stages of an axial flow compressor for an aircraft gas turbine engine.

The primary advantage of the invention is its unexpected ability to increase the compressor's surge margin while not degrading its steady state efficiency.

These and other advantages and features of the invention will become more apparent in view of the following discussion of the best mode for carrying out the invention and the accompanying drawings.

BEST MODE FOR CARRYING OUT THE INVENTION

This invention is predicated in part on the recognition that diminished surge margin in a gas turbine engine compressor is at least partly attributable to diminished axial velocity of the airflow radially outward of the midspan of the compressor flowpath (particularly near the outer flowpath wall), and that radial redistribution of the airflow axial velocity can markedly improve the surge margin with little or no loss of efficiency at normal levels of the compressor operating line.

Figure 1:
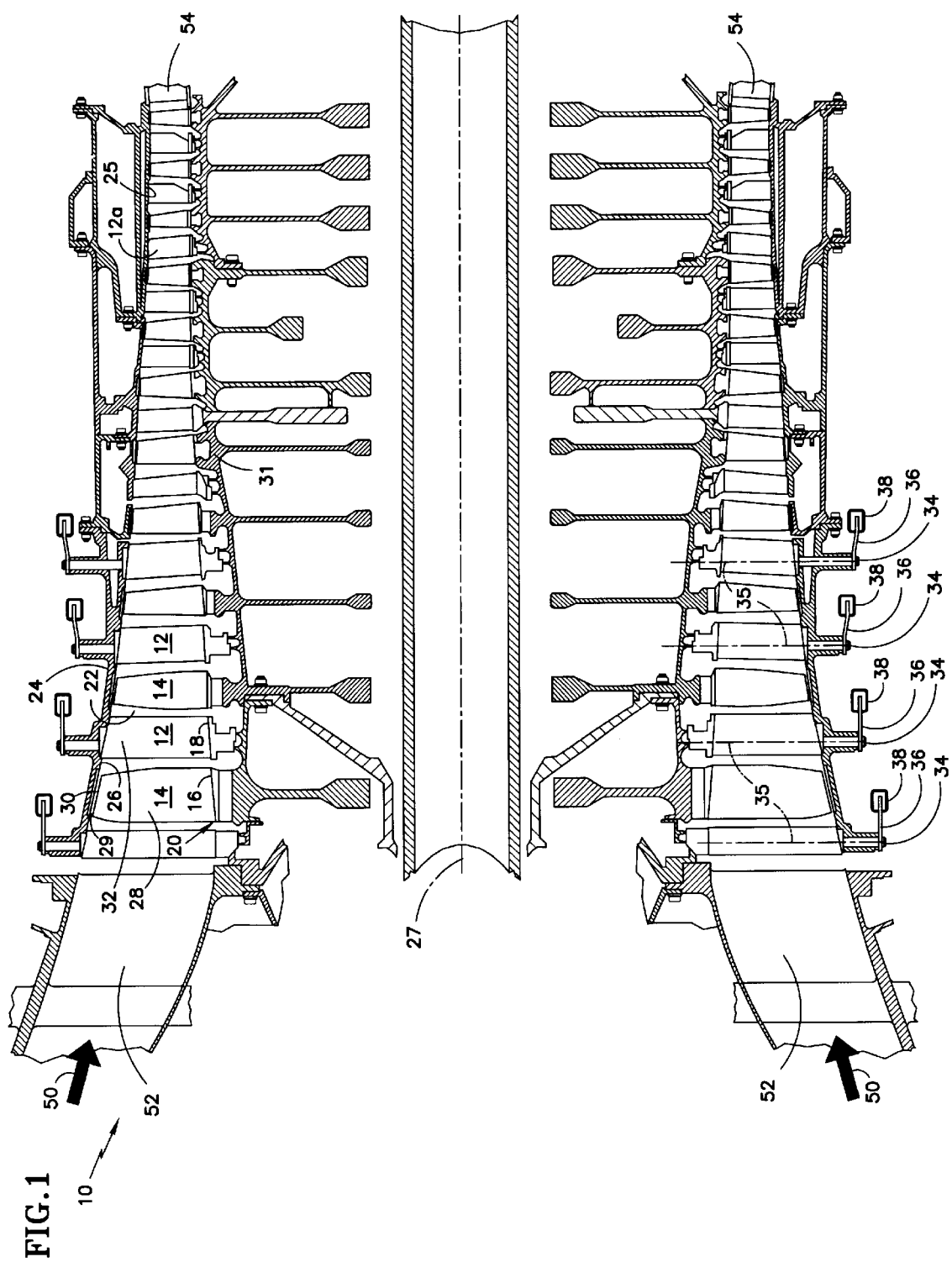
FIG. 1 is a simplified cross sectional side elevation of an axial flow compressor for a turbine engine incorporating flow directing elements of the present invention in selected compressor stages.

Referring to FIG. 1, a gas turbine engine axial flow compressor 10 includes axially alternating rows or stages of flow directing elements such as nonrotating stator vanes 12, 12a and rotating blades 14 (only a limited number of flow directing elements are labeled to preserve the clarity of the figure). Platforms 16, 18 at the inner ends of the blades and vanes define an inner wall 20 of a compressor flowpath 22. A compressor case assembly 24 and outer platforms 25 on some of the vanes define an outer wall 26 of the compressor flowpath. The inner and outer walls circumscribe a longitudinal central axis 27 so that the compressor flowpath is annular. Airfoil portions 28 of the blades extend radially from the inner wall and terminate just short of the outer wall, leaving a small gap 29 between each blade tip 30 and the outer wall. Radially inward of the inner wall, each blade is attached to a rotor 31. During engine operation, the rotor and the blades attached thereto rotate about the axis. Airfoil portions 32 of the vanes extend radially across the compressor flowpath from the inner wall to the outer wall. The vanes do not rotate about axis 27 during engine operation. However at least one stage of vanes may be supported on trunnions 34 and each vane so supported is pivotable about a radial axis 35. The pivotable vanes 12 are referred to as variable vanes. Each variable vane is connected by a connecting arm 36 to a unison ring 38 which extends circumferentially about the compressor. Actuators, not shown, translate the unison rings circumferentially to cause the variable vanes to pivot. Those vanes such as 12a that are not pivotable are referred to as fixed vanes.

During engine operation a stream of cool, low pressure air 50 is drawn into the intake 52 of the compressor. The air is pressurized and directed axially rearward by the cooperative action of the blades and vanes. Hot, high pressure air exits from the compressor discharge 54. Because the compressor is urging the air to flow in the direction of increasing pressure, the compressor is susceptible to the problem of surge described previously.

Figure 2:
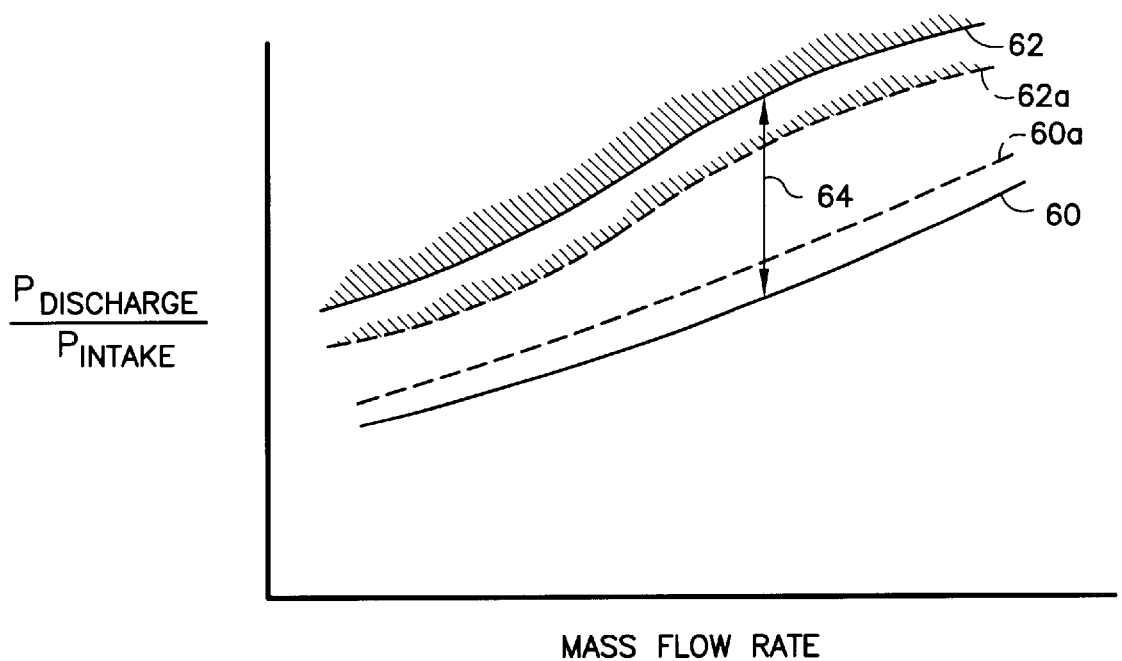
FIG. 2 is a simplified map of compressor performance showing normal and degraded operating lines and surge boundaries.

Compressor performance is typically described by reference to a compressor map as shown in FIG. 2. The map shows the pressure ratio across the compressor (i.e. the ratio of pressure at the compressor discharge to pressure at the compressor intake) as a function of the mass flow rate through the compressor. An operating line 60 is a locus of the compressor's normal steady state operating conditions. A surge line 62 defines a locus of conditions at or above which the engine will surge. Surge margin is a measure of a compressor's resistance to surge and can be visualized as the vertical distance 64 between the operating line and the surge line at constant airflow. Surge margin is usually expressed as a percent of the compressor pressure ratio at the operating line. During an engine's life, engine deterioration causes a continual and permanent degradation of the engine's surge margin, that is, the surge line decreases (as shown by deteriorated surge line 62a relative to surge line 62) and/or the operating line increases (as shown by deteriorated operating line 60a relative to operating line 60). Temporary but significant loss of surge margin is also experienced during certain transient events such as rapid engine power changes or operation of the engine in crosswinds. Often these transient losses are manifested as temporary operation at operating line levels significantly above the normal operating line. Designers endeavor to provide ample steady state surge margin to accommodate these inevitable losses in surge margin. Unfortunately, and as is well known, improvements in steady state surge margin are achieved at the expense of reduced compressor and engine efficiency at normal levels of the compressor operating line. Conversely, improvements in efficiency reduce the surge margin.

The present invention has the unique, unusual and highly desirable effect of improving compressor surge margin with little or no loss of compressor efficiency at normal levels of the compressor operating line. In one experimental evaluation, surge margin was markedly improved and efficiency actually increased slightly.

Figure 3:
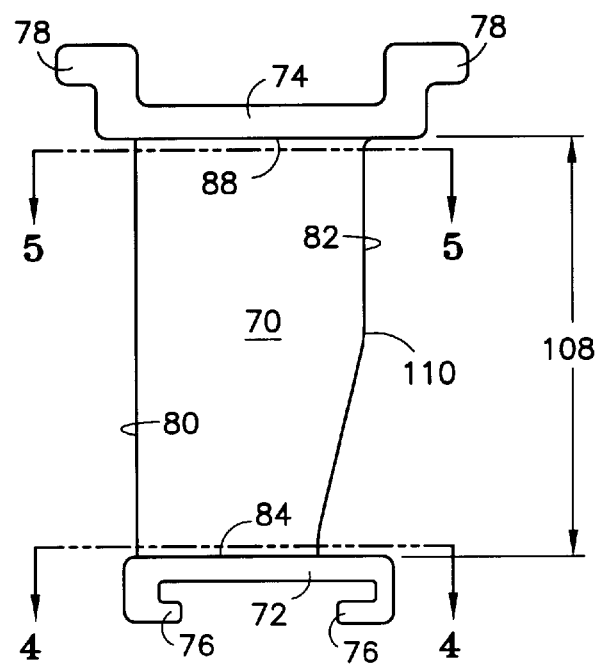
FIG. 3 is a side elevation of a compressor fixed stator according to the present invention.
Figure 4:
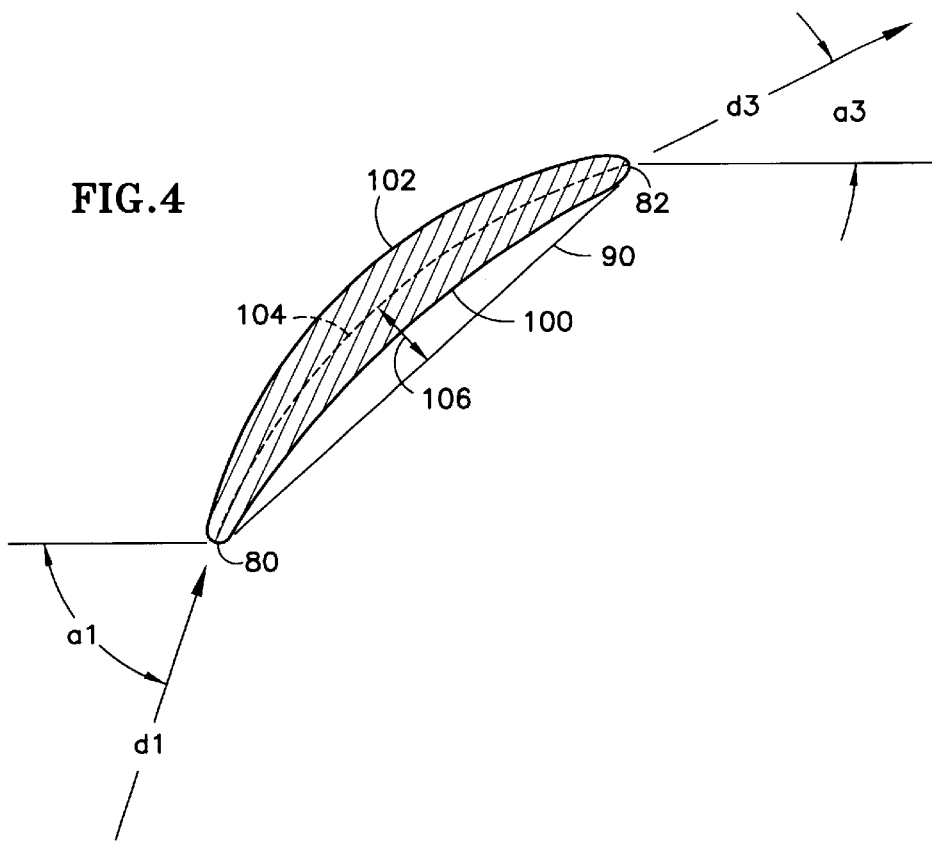
FIG. 4 is a cross sectional view taken along the line 4—4 of FIG. 3 showing a representative cross section of the constant chord portion of the stator.
Figure 5:
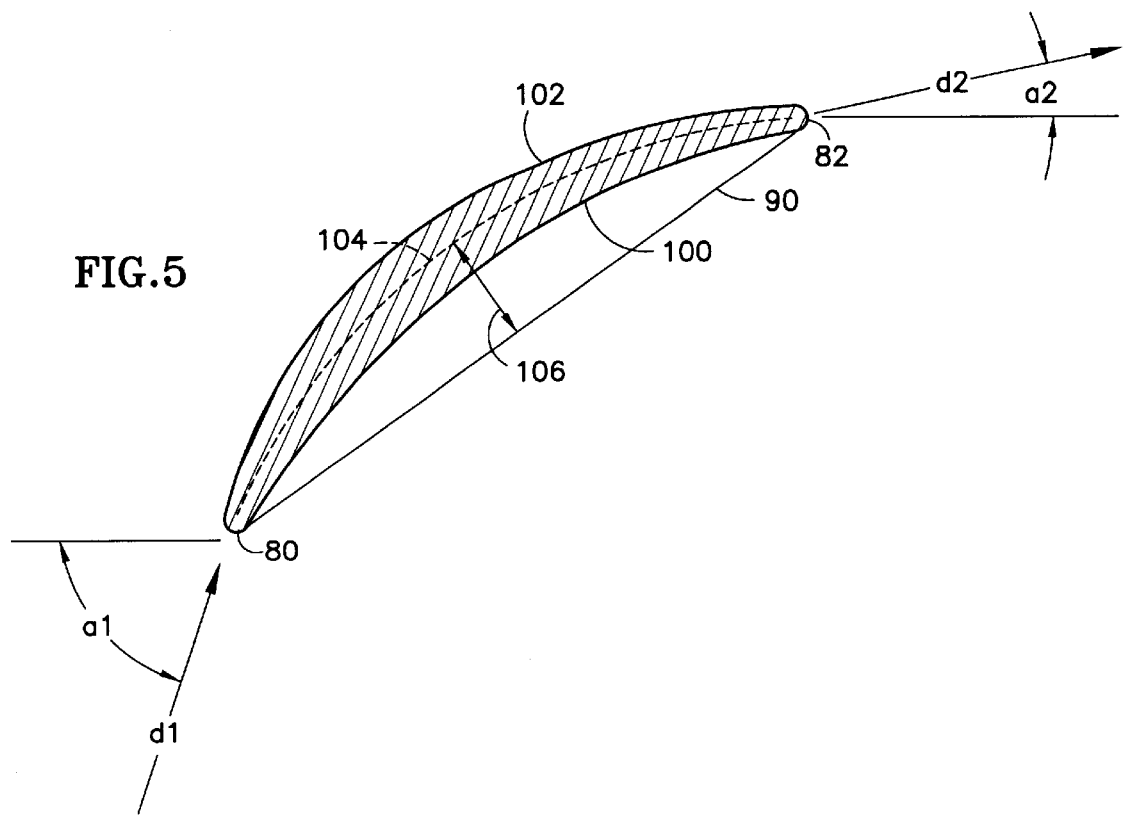
FIG. 5 is a cross sectional view taken along the line 5—5 of FIG. 3 showing a representative cross section of the variable chord portion of the stator.

FIG. 3, 4 and 5 illustrate a fixed stator vane according to the present invention. The vane includes an airfoil portion 70 and integral inner and outer platforms 72, 74. Hooks 76 on the inner platform are provided to attach airseals to the vane. The airseals are not embraced by the invention and therefore are not shown. Feet 78 on the outer platform provide means for attaching the vane to the case assembly (FIG. 1).

The airfoil section has a leading edge 80, a trailing edge 82, a root 84 at the juncture of the airfoil and the inner platform, and a tip 88 at the juncture of the airfoil and the outer platform. An imaginary chord line 90 extends from the leading edge 80 to the trailing edge 82. The length of the chord line is referred to as the chord of the airfoil. The airfoil is curved or cambered so that one side, referred to as the pressure surface 100, is concave and the other side, referred to as the suction surface, 102 is convex. A mean camber line 104 is the locus of points midway between the pressure and suction sides as measured perpendicular to the mean camber line. Airfoil curvature is quantified by its camber 106 which is the maximum deviation of the mean camber line from the chord line. Camber is often expressed as a percentage of chord. The airfoil span 108 is the distance along the airfoil from the root to the tip.

According to the present invention, the chord of the airfoil is variable. The chord generally increases from a first value at the root to a second larger value at a part span location 110 intermediate the root and the tip so that when the airfoil is installed in a compressor, the location of the trailing edge becomes closer to the compressor discharge as the spanwise distance from the root increases. The portion of the airfoil between the root and the part span location is referred to as the reduced chord or variable chord portion of the airfoil. The chord is generally constant from the part span location to the tip. The leading edge of the airfoil, as installed in an engine, is generally radial when viewed in side elevation (as in FIGS. 1 and 3) However the invention's utility extends to airfoils whose leading edge is circumferentially bowed as seen in a front elevation. An example of such an airfoil is disclosed and claimed in U.S. Pat. No. 5,088,892 issued to Weingold et al. and assigned to the assignee of the present invention.

Figure 6A:
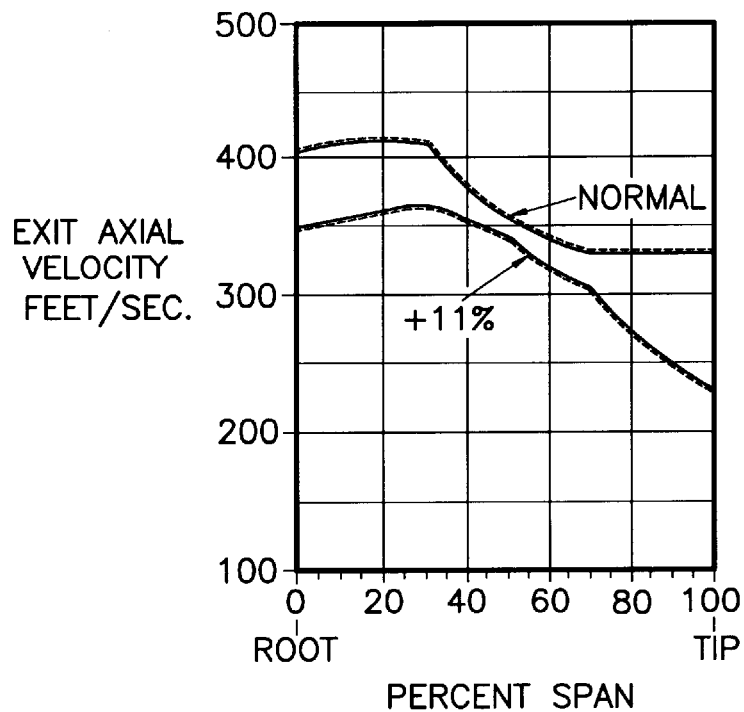
FIG. 6a is a graph of the radial distribution of axial velocity in a compressor with prior art airfoils showing operation on both a normal and an elevated operating line.
Figure 6B:
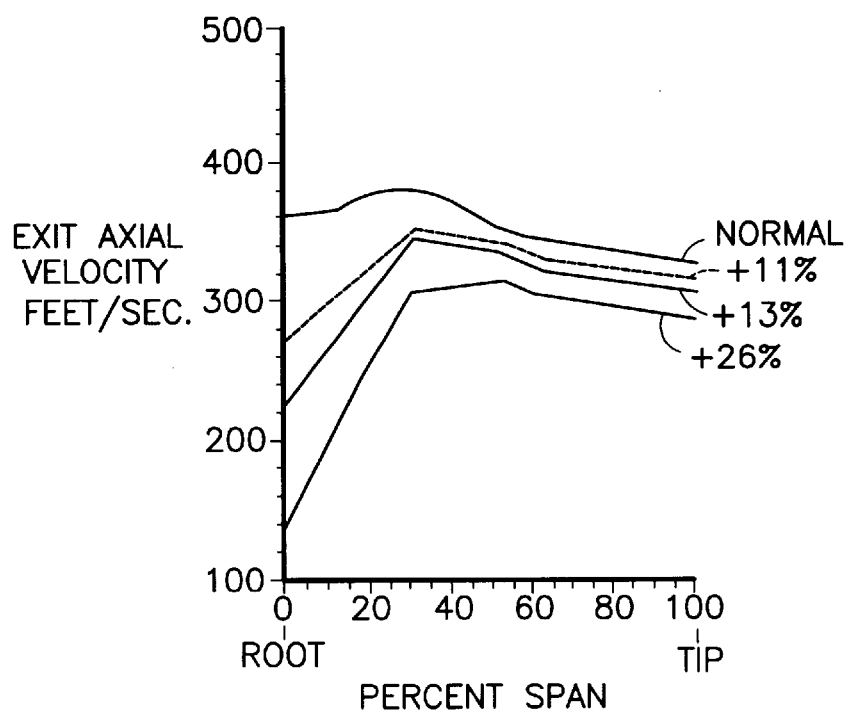
FIG. 6b is a graph of the radial distribution of axial velocity in a compressor with fixed stators according to the present invention, showing operation on normal and elevated operating lines.

The improved surge margin associated with the variable chord airfoil is due at least in part to a radial redistribution of the axial velocity of the airflow through the compressor flowpath as shown in FIGS. 6a and 6b.

FIG. 6a shows analytically estimated axial airflow velocities as a function of percent airfoil span at the discharge of a compressor having prior art airfoils. The compressor has 11 stages of rotating blades and 12 stages of nonrotating vanes with the first 4 stages of vanes being variable vanes and the last 8 stages being fixed vanes. Operation on both a normal operating line and an operating line 11% above normal is shown. The figure illustrates that with prior art airfoils, axial velocity is generally maximum near the airfoil root, and decreases to a lower value at the tip. The reduction of axial velocity with increasing span is especially dramatic with the elevated operating line.

FIG. 6b shows a similar assessment of axial flow velocity in a compressor incorporating vanes according to the present invention in the first through seventh stages of the 8 fixed stages of vanes. Estimates are shown for a normal operating line as well as operating lines elevated 13% and 26% above normal (velocities for an 11% elevated operating line are interpolated to facilitate a direct comparison with FIG. 6). The figures demonstrate that the variable chord airfoil radially redistributes the axial airflow velocities so that the velocities, in comparison to the velocities with prior art airfoils, are lower at the airfoil root and higher at the tip, i.e. near the flowpath outer wall.

The importance of increased axial velocity near the flowpath outer wall is appreciated by considering the effect of the clearance gap 29 (FIG. 1) between the tip of each rotating blade and the outer flowpath wall. Air adjacent the pressure surface of each blade leaks through the gap to the suction side of the blade, thereby creating a tip leakage vortex. The tip leakage vortex partially blocks the flow of air near the outer wall. The blockage becomes increasingly severe as the operating line becomes elevated. If the axial velocity of the air coming off the stator tips is low, as is the case with the prior art stators, the blockage attributable to the tip leakage vortex is difficult to overcome and can result in aerodynamic stall of the blade tips. The tip stall can easily develop into a compressor surge. By contrast, use of stators according to the present invention produces higher axial velocities near the blade tips and helps to overcome the tip clearance vortex.

Referring again to FIGS. 4 and 5, the means by which the variable chord airfoil redistributes the flow velocity is explained in terms of the change in flow direction imparted by the vane. The constant chord portion of the vane (FIG. 5) turns the flow from its incoming direction d1, which forms angle a1 with the axial direction, to an exiting direction d2 at angle a2 with respect to the axial direction. The reduced chord portion (FIG. 4) turns the flow from direction d1 to direction d3 at angle a3 relative to the axial direction. Because the reduced chord portion has less curvature or camber 106 than the constant chord portion, direction d3 near the airfoil root is considerably farther from the axial direction than is d2. Of course at spanwise locations more distant from the root, direction d3 is closer to the axial direction and, at location 110, directions d2 and d3 are the same. Because the variable chord portion does not turn the flow as far toward the axial direction as does the constant chord portion, the axial velocity must increase along the constant chord portion to maintain the volume flow rate of air through the compressor.

Figure 7:
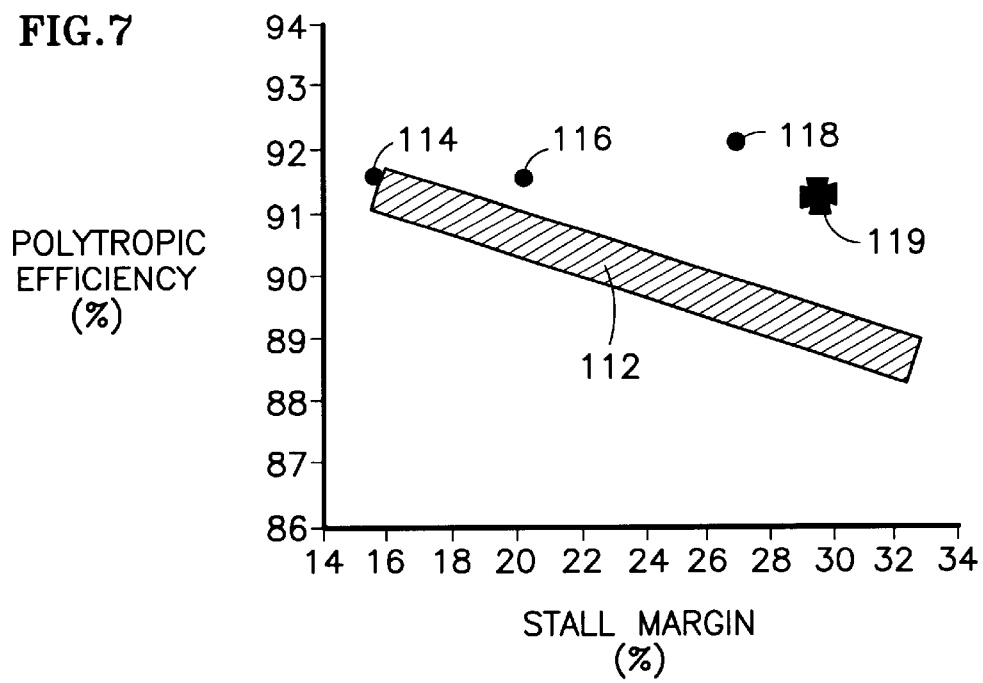
FIG. 7 is a graph showing the customarily expected loss of compressor efficiency with improved surge margin, and the retention of efficiency with improved surge margin attributable to the present invention.

FIG. 7 shows the relationship between surge margin and compressor efficiency at normal operating line levels. Shaded band 112 shows the customarily expected loss of efficiency with improved surge margin. Data points 114, 116 and 118 show test results of compressors with and without variable chord airfoils. For experimental convenience, these compressors were tested in isolation rather than being installed in a turbine engine. Data point 114, shows the efficiency and surge margin of a compressor having prior art airfoils, i.e. the compressor whose velocity profile is shown in FIG. 6a. Point 118 illustrates a compressor having 7 stages of fixed airfoils according to the present invention (i.e. the compressor whose velocity profile is shown in FIG. 6b). Point 116 corresponds to a similar compressor wherein the stators in the first through fourth stages of the 8 stages of fixed stators are constructed according to the present invention. Finally, point 119 confirms the validity. of the isolated compressor testing by showing the performance observed with the compressor of data point 118 installed in a turbine engine.

As is abundantly clear from FIG. 7, the stators of the present invention not only improve surge margin, but do so without compromising efficiency at or near the normal operating line—a result contrary to the expectation illustrated by band 112. The reduction of chord in the reduced chord portion of the airfoil is small enough that no noticeable loss of compressor efficiency occurs at or near the normal level of the compressor operating line. At operating line levels significantly higher than the normal operating line, some loss of efficiency is experienced. However this loss is inconsequential since such operating line levels are normally encountered only transiently, for example during a rapid transition between two stabilized operating conditions. The brief intervals of time spent operating at these elevated operating line levels do not significantly affect the steady state performance of the compressor which usually runs at or near the normal operating line.

Figure 8:
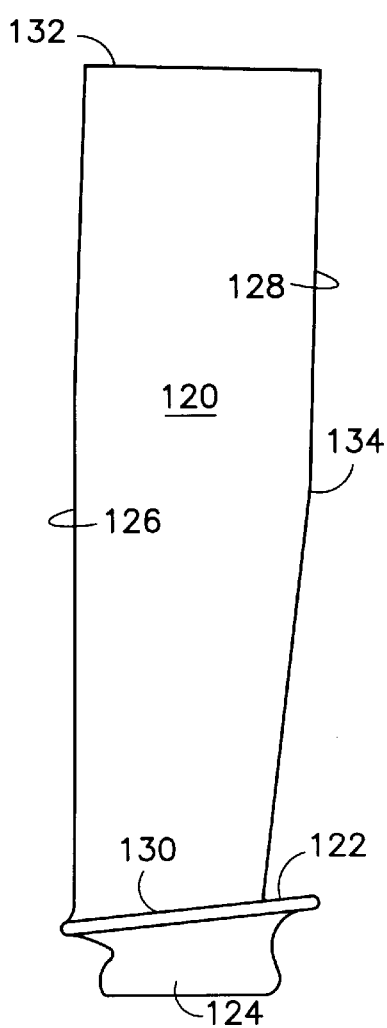
FIG. 8 is a side elevation of a compressor blade according to the present invention.

Although the preceding discussion refers to stator vanes, compressor blades constructed according to the invention are expected to have a similar beneficial effect. FIG. 8 shows a compressor blade according to the present invention. The blade includes an airfoil section 120, and an integral inner platform 122. Attachment means 124 radially inward of the inner platform is provided for attaching the blade to a rotor. The airfoil section has a leading edge 126, a trailing edge 128, a root 130 at the juncture of the airfoil and the inner platform, and a tip 132 at the extreme outer end of the airfoil. As with the stator of FIG. 3, the chord of the airfoil is variable. The chord generally increases from a first value at the root to a second larger value at a part span location 134 intermediate the root and the tip. The chord is generally constant from the part span location to the tip.

Analytical and experimental evaluations of stator vanes constructed according to the invention suggest that the part span location 110 is preferably between 25% and 75% of the airfoil span, although it is believed that any part span location between 5% and 95% of the airfoil span will yield good results. In the best mode contemplated for carrying out the invention, the part span location is 50% of the airfoil span. As shown by data points 114, 116, 118 and 119 in FIG. 7, an increase in the number of stages of variable chord fixed vanes yields a corresponding increase in the compressor surge margin.

In many instances, the compressor stage most likely to initiate a compressor surge can be identified from testing or analysis. In such instances, it is most beneficial if the first of the one or more stages of variable chord flow directing elements is at least one stage upstream (i.e. toward the compressor intake) of the identified stage. Such placement ensures that the radial redistribution of axial velocity has sufficient time and axial distance to become fully developed and stabilized.

Analyses and experimental trials also reveal that the ratio of the first value of chord (at the root) to the second value of chord (at the part span location) is between 0.7 and 0.9, that is the root chord is 70% to 90% of the maximum chord. In the best mode contemplated for carrying out the invention, the ratio is 0.8.

Although the invention has been described in the context of an axial flow compressor for a gas turbine engine, the invention's applicability includes bladed compressors, including centrifugal compressors, for any application. Moreover, the invention is useful for turbines, although turbines usually operate with abundant surge margin and therefore may not require the surge margin augmentation afforded by the invention.

What is claimed is:

1. A flow directing element for a gas turbine engine, the flow directing element being a compressor element having a cambered airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, and a camber, the camber throughout the tip portion being greater than the camber throughout the root portion so that the airfoil turns fluid flowing through the compressor through a turning angle, the turning angle throughout the tip portion being greater than the turning angle throughout the root portion.

2. The flow directing element of claim 1 wherein the camber varies from a first value near the root to a second, larger value at the intermediate location.

3. The flow directing element of claim 2 wherein the camber increases from the first value near the root to the second, larger value at the intermediate location.

4. The flow directing element of claim 2 or 3 wherein the camber is substantially constant throughout the tip portion.

5. A flow directing element for directing a flowing fluid in a gas turbine engine, the element having an airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, the chord throughout the tip portion being greater than the chord throughout the root portion so that the airfoil turns the fluid from an incoming direction to an exiting direction and the exiting direction throughout the tip portion is closer to an axial direction than the exiting direction throughout the root portion.

6. The flow directing element of claim 5 wherein the chord varies from a first value near the root to a second, larger value at the intermediate location.

7. The flow directing element of claim 6 wherein the chord increases from the first value near the root to the second, larger value at the intermediate location.

8. The flow directing element of claim 6 or 7 wherein the chord is substantially constant throughout the tip portion.

9. A flow directing element for directing a flowing fluid in a gas turbine engine, the element having an airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, the chord throughout the tip portion being greater than the chord throughout the root portion so that the airfoil sacrifices axial velocity of the fluid in the root airfoil portion in return for increased axial velocity in the tip airfoil portion.

10. The flow directing element of claim 9 wherein the chord varies from a first value near the root to a second, larger value at the intermediate location.

11. The flow directing element of claim 10 wherein the chord increases from the first value near the root to the second, larger value at the intermediate location.

12. The flow directing element of claim 10 or 11 wherein the chord is substantially constant throughout the tip portion.

13. A flow directing element for directing a flowing fluid in a gas turbine engine, the flow directing element being a compressor element having an airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, the chord throughout the tip portion being greater than the chord throughout the root portion so that the airfoil turns the fluid through a turning angle, the turning angle throughout the tip portion being greater than the turning angle throughout the root portion.

14. The flow directing element of claim 13 wherein the chord varies from a first value near the root to a second, larger value at the intermediate location.

15. The flow directing element of claim 14 wherein the chord increases from the first value near the root to the second, larger value at the intermediate location.

16. The flow directing element of claim 14 or 15 wherein the chord is substantially constant throughout the tip portion.

17. A flow directing element for directing a flowing fluid in a gas turbine engine, the element having an airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, the airfoil being configured to turn the fluid from an incoming direction that forms an incoming angle relative to an axial direction to an exiting direction that forms an exiting angle relative to the axial direction, the exiting direction throughout the tip portion being closer to the axial direction than the exiting direction throughout the root portion.

18. The flow directing element of claim 17 wherein the exiting direction varies from a first direction near the root to a second, more axially oriented direction at the intermediate location.

19. The flow directing element of claim 18 wherein the exiting direction varies monotonically from the first direction near the root to the second, more axially oriented direction at the intermediate location.

20. The flow directing element of claim 18 or 19 wherein the exiting direction is substantially constant throughout the tip portion.

21. A flow directing element for directing a flowing fluid in a gas turbine engine, the flow directing element having an airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, the airfoil being configured to sacrifice axial velocity of the fluid in the root airfoil portion in return for increased axial velocity in the tip airfoil portion.

22. A flow directing element for directing a flowing fluid in a gas turbine engine, the flow directing element being a compressor element having an airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, the airfoil being configured to turn the fluid through a turning angle, the turning angle throughout the tip portion being greater than the turning angle throughout the root portion.

23. The flow directing element of claim 22 wherein the turning angle varies from a first value near the root to a second, larger value at the intermediate location.

24. The flow directing element of claim 23 wherein the turning angle increases from the first value near the root to the second, larger value at the intermediate location.

25. The flow directing element of claim 23 or 24 wherein the turning angle is substantially constant through the tip portion.

26. A compressor stator vane for a gas turbine engine compressor, the stator urging fluid to flow in a direction of increasing pressure, the stator vane having an airfoil with a leading edge, a trailing edge, a chord extending from the leading edge to the trailing edge, a root, a tip, a span extending from the root to the tip and having a pre-established part span location intermediate the root and the tip that defines a juncture between a tip airfoil portion that extends spanwisely from the juncture to the tip and a root airfoil portion, distinct from the tip airfoil portion, that extends spanwisely from the juncture to the root, the chord throughout the tip portion being greater than the chord throughout the root portion.

27. The flow directing element of claim 26 wherein the chord varies from a first value near the root to a second, larger value at the intermediate location.

28. The flow directing element of claim 27 wherein the chord increases from the first value near the root to the second, larger value at the intermediate location.

29. The flow directing element of claim 27 or 28 wherein the chord is substantially constant throughout the tip portion.

30. The flow directing element of any one of claims 1, 5, 9, 13, 17, 21, 22 or 26 wherein the element is a stator vane.

* * * * *